L. TAVANI & B. SANTIROCCO.
MECHANISM FOR DRYING MACARONI.
APPLICATION FILED OCT. 17, 1916.

1,255,350.

Patented Feb. 5, 1918.
2 SHEETS—SHEET 1.

Inventors:
Luigi Tavani,
and Berardi Santirocco,
By Chas. N. Butler
Attorney.

L. TAVANI & B. SANTIROCCO.
MECHANISM FOR DRYING MACARONI.
APPLICATION FILED OCT. 17, 1916.

1,255,350.

Patented Feb. 5, 1918.
2 SHEETS—SHEET 2.

Inventors:
Luigi Tavani,
and Berardi Santirocco,
By Chas. N. Butler
Attorney.

UNITED STATES PATENT OFFICE.

LUIGI TAVANI AND BERARDI SANTIROCCO, OF WEST CHESTER, PENNSYLVANIA.

MECHANISM FOR DRYING MACARONI.

1,255,350.  Specification of Letters Patent.  Patented Feb. 5, 1918.

Application filed October 17, 1916. Serial No. 126,082.

*To all whom it may concern:*

Be it known that we, LUIGI TAVANI and BERARDI SANTIROCCO, respectively a citizen of the United States and a subject of the King of Italy who has declared his intention of becoming a citizen of the United States, both residents of West Chester, in the county of Chester and State of Pennsylvania, have invented Improved Mechanism for Drying Macaroni, of which the following is a specification.

Our invention is designed for the purpose of drying macaroni expeditiously, efficiently and economically with the production of an improved product.

In the preferred practice of our invention, the macaroni is suspended by means of racks in a closed compartment through which air is circulated with the aid of deflectors. This compartment communicates at its opposite ends with a passage having a contracted throat containing a fan adapted to be operated in reverse directions for the purpose of reversing the air periodically in the macaroni compartment, the fan passage containing coils for circulating a heating fluid to provide the circulating air with the desired temperature. A second passage is connected with the first passage by valved ports and is provided with a fan for exhausting a desired amount of the air that has been used in the drying operation and taken up moisture from the macaroni.

The temperature is preferably changed so that the air is alternately at a temperature of from 60 to 70 degrees for about two hours while the circulation is in one direction, and from 95 to 105 degrees for the succeeding two hours, while the circulation is in the opposite direction, and so on through a period of approximately ten hours.

It will be understood, however, that changes may be made in the structure and method of operation without departing from the spirit of our invention.

The nature and characteristic features of our improvements will be more fully understood from the following description and the accompanying drawings in illustration thereof.

Figure 1:
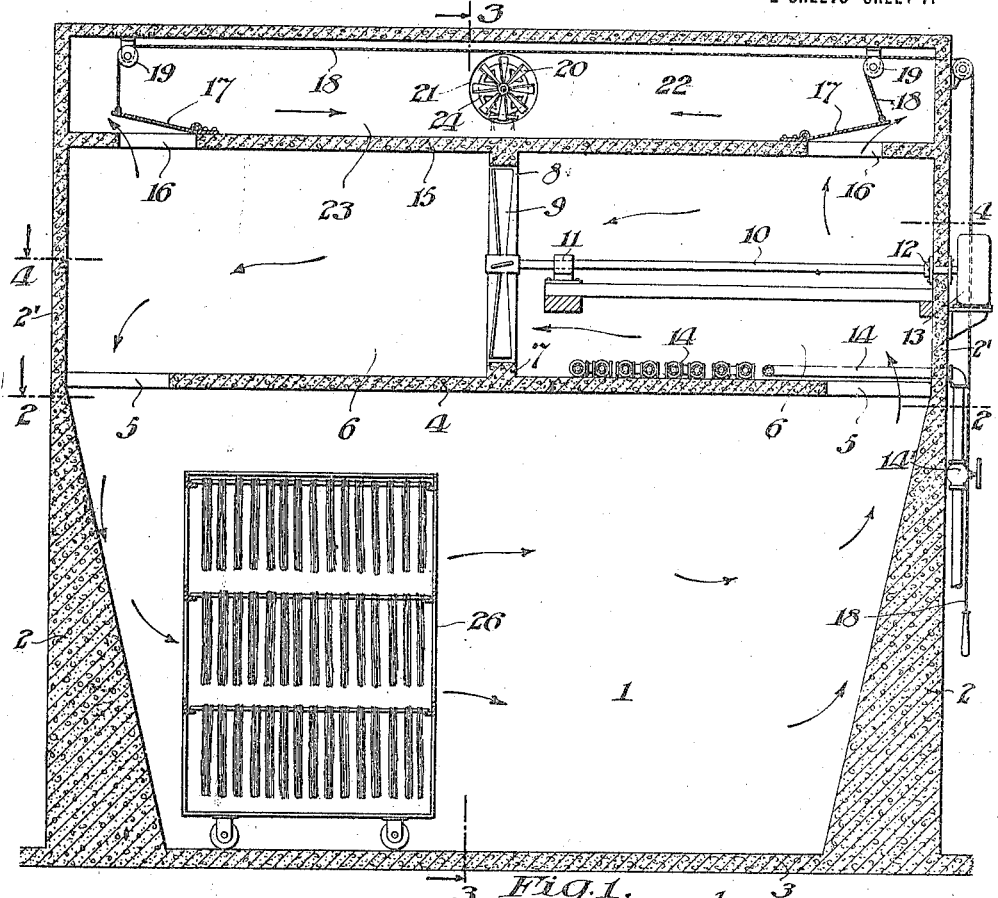
Figure 2:
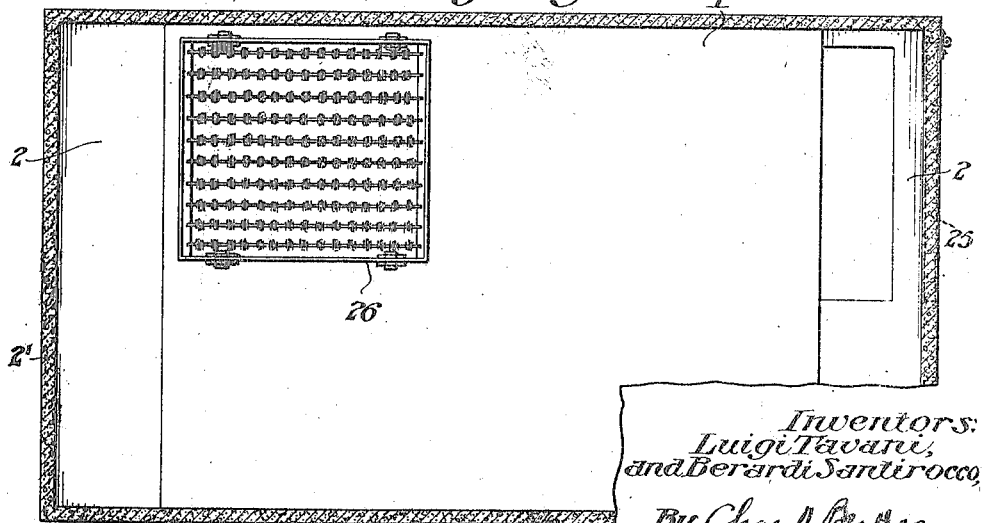
Figure 3:
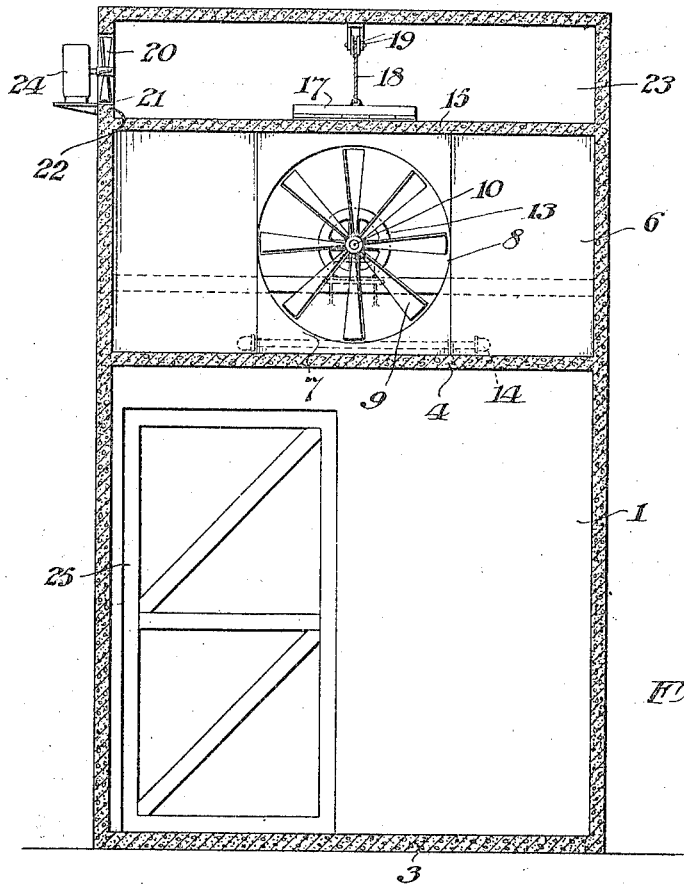
Figure 4:
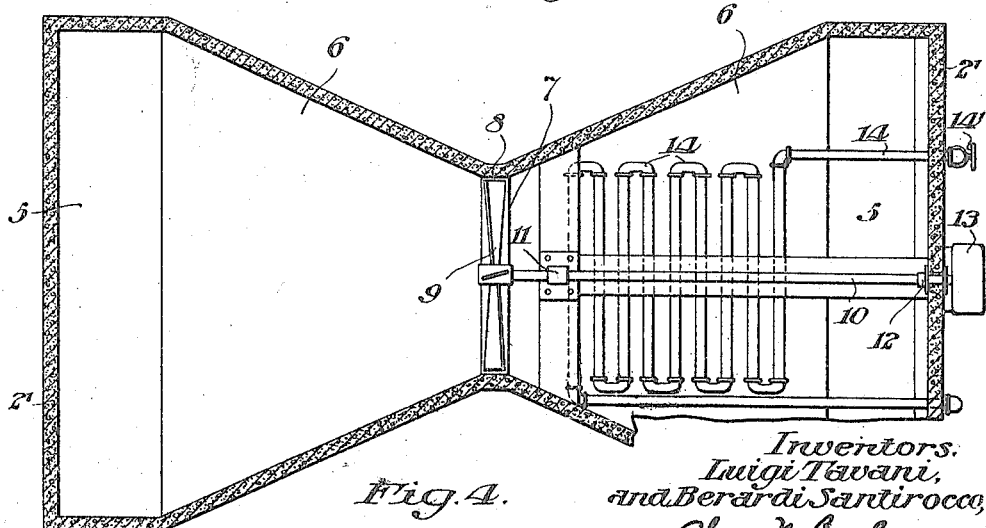

In the drawings, Figure 1 is a vertical sectional view of mechanism embodying our improvements; Fig. 2 is a broken horizontal sectional view taken on the line 2—2 of Fig. 1; Fig. 3 is a vertical sectional view taken on the line 3—3 of Fig. 1; and Fig. 4 is a broken horizontal sectional view taken on the line 4—4 of Fig. 1.

Our invention, in the form thereof illustrated in the drawings, embodies a compartment 1 having end walls 2 with inner faces inclining from the bottom 3 of the chamber upwardly and outwardly to the level of the top or ceiling 4, which contains end ports 5 extending the width of the compartment.

The ports 5 connect the ends of the compartment 1, at its top, with the ends of a passage formed by the sections 6 tapering oppositely to a throat 7, the passage having a circular opening 8 in its throat.

A fan 9 is adapted to be revolved in the opening 8 by means of the fan-shaft 10 which is journaled in the bearings 11 and 12 and revolved by a motor 13, the shaft extending through the upper part 2' of the wall 2 and the motor being located exterior to the passage.

Coils 14 are located in one of the passage sections 6, for the circulation of a heating fluid and warming the air drawn or driven thereover by the fan 9.

The top or roof 15 of the passage 6 contains the ports 16 controlled by the valves 17 which are adjusted conveniently by cords 18 passing therefrom over rollers 19 and through the wall section 2' to a position convenient for manipulation by an operator.

A fan 20 is disposed in a passage 21 in a wall 22 of a chamber 23 above the ports 16 and is driven by a motor 24, for the purpose of exhausting moist air from the system.

A door 25, through which the traveling racks 26 are adapted to move into and out of the compartment 1, permits a certain amount of pure air to filter through the joints which it makes in the wall, to replace to a greater or less degree that exhausted by the fan 20.

It will be understood that in operation the fan 9 is revolved by the motor 13 in one direction for say two hours and the air is circulated through the compartments 1 and 6 in a course indicated by the arrows in Fig. 1, a part of the circulating air being drawn off through the ports 16, passage 23 and opening 21 by the fan 20 for the purpose of changing the air acting on the macaroni and remove moisture given up thereby.

At the end of this period, the action of the fan 9 is reversed and air flows through the compartments 1 and 6 in a course reverse to that indicated by the arrows, at the end of which period the operation is again reversed and so on.

The form of the passage comprising the tapered sections 6 conduces to efficient circulation at a comparatively high velocity or pressure and efficient distribution of the blast in the macaroni compartment.

The temperature of the air to which the macaroni is subjected can be controlled as desired by operating the valves 14' controlling the flow of heating fluid in the coils 14.

Having described our invention, we claim:

1. The mechanism for drying macaroni which consists in a drying compartment, means forming an air passage communicating therewith at both ends thereof, a fan for circulating air through said passage and compartment, and an exhaust chamber for drawing off air circulated through said passage and compartment.

2. The mechanism for drying macaroni which consists in a drying compartment having downwardly converging walls and ports extending substantially across the top thereof, means forming an air passage communicating with said compartment through said ports and having converging walls forming a throat, a circulating coil in said passage, means for forcing air through said passage and compartment and over said coil, an exhaust chamber communicating with said air passage, means for controlling the communication between said chamber and passage, and a fan for exhausting said chamber.

In testimony whereof we have hereunto set our names this tenth day of October 1916.

LUIGI TAVANI.
BERARDI SANTIROCCO.